(12) United States Patent
Shimizu et al.

(10) Patent No.: US 6,808,576 B2
(45) Date of Patent: Oct. 26, 2004

(54) FORMED LINING FOR VEHICLE AND METHOD FOR MANUFACTURING THE SAME

(75) Inventors: Takashi Shimizu, Takanezawa-machi (JP); Masanari Yasuda, Takanezawa-machi (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

(21) Appl. No.: 09/425,027

(22) Filed: Oct. 25, 1999

(65) Prior Publication Data

US 2002/0122930 A1 Sep. 5, 2002

(30) Foreign Application Priority Data

May 31, 1999 (JP) .............................. 11-152308

(51) Int. Cl.⁷ .............................................. B32B 31/00
(52) U.S. Cl. ..................... 156/87; 156/212; 156/245; 296/214; 428/317.1
(58) Field of Search ........................... 428/317.1, 317.5, 428/317.7, 474.4; 156/87, 91, 291, 295, 217, 245, 306.6; 296/214

(56) References Cited

U.S. PATENT DOCUMENTS

| | | | | |
|---|---|---|---|---|
| 3,850,725 A | * | 11/1974 | Spielau et al. | 156/291 |
| 4,452,840 A | * | 6/1984 | Sato et al. | 428/120 |
| 4,925,513 A | * | 5/1990 | Witzke et al. | 156/245 |
| 4,940,112 A | * | 7/1990 | O'Neill | 181/290 |
| 5,087,311 A | * | 2/1992 | Elliott et al. | 156/212 |
| 5,187,123 A | * | 2/1993 | Yoshida et al. | 156/291 |
| 5,346,569 A | * | 9/1994 | Simon | 156/102 |
| 5,399,220 A | * | 3/1995 | Winslow | 156/273.3 |
| 5,539,072 A | * | 7/1996 | Wu | 526/304 |
| 5,647,943 A | * | 7/1997 | Kozlowski | 156/310 |
| 5,695,865 A | * | 12/1997 | Shimizu | 428/212 |
| 5,750,444 A | * | 5/1998 | Jarrell et al. | 442/62 |
| 5,882,782 A | * | 3/1999 | Tsubone | 428/317.1 |
| 5,900,300 A | * | 5/1999 | Slaven | 428/71 |
| 6,080,469 A | * | 6/2000 | Ozeki et al. | 428/213 |
| 6,190,482 B1 | * | 2/2001 | Colasanto | 156/177 |

* cited by examiner

Primary Examiner—Jeff H. Aftergut
Assistant Examiner—John L. Goff
(74) Attorney, Agent, or Firm—Oliff & Berridge, PLC

(57) ABSTRACT

A formed lining for a vehicle comprises a multi-layered base member comprising a film-like hot melt adhesive on a front thereof and a top cover member comprising a web-like hot melt adhesive on a back thereof, wherein the top cover member is bonded to the multi-layered base member. The top cover member and the heated multi-layered base member are set in a forming die. The hot melt web on the top cover member is melted by heat of the multi-layered base member during a forming process. Then, the top cover member is bonded to the multi-layered base member to be formed simultaneously.

2 Claims, 4 Drawing Sheets

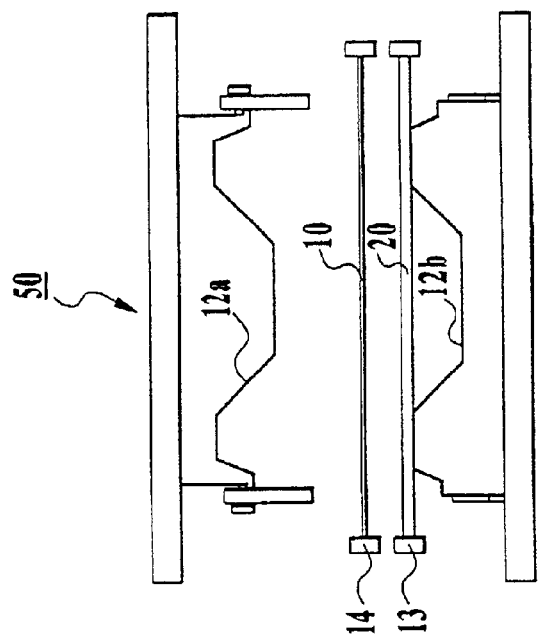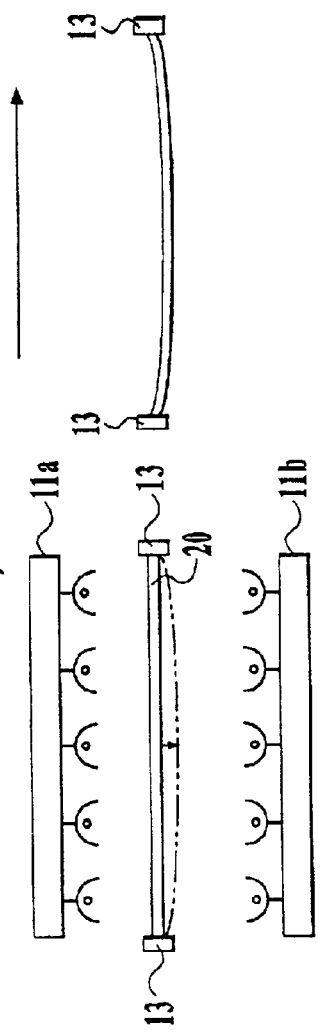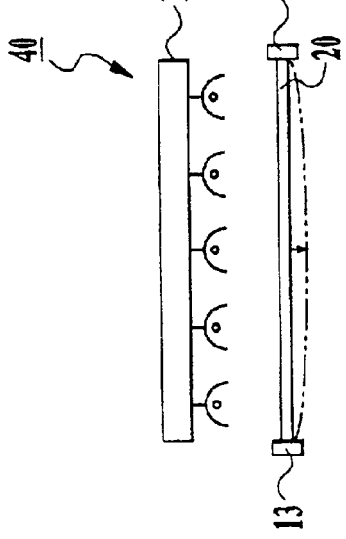

US 6,808,576 B2

FORMED LINING FOR VEHICLE AND METHOD FOR MANUFACTURING THE SAME

BACKGROUND OF THE INVENTION

1. Field of the Invention

The present invention relates to a formed lining for a vehicle, particularly, a structure of the formed lining of which a base member and a top cover member are bonded at the same time that the lining is formed.

2. Description of Related Art

Generally, a formed lining for a vehicle, which has a structure that a base member and a top cover member are bonded and formed at the same time has been known. For example, FIGS. 4A and 4B show a formed lining for a vehicle in earlier technology: wherein FIG. 4A is a sectional view showing a top cover member 30; and FIG. 4B is a sectional view showing a multi-layered base member 20. The formed lining for a vehicle, wherein the top cover member 30 is bonded to the multi-layered base member 20 having a hot melt film 5 on a front thereof, has been known.

The top cover member 30 has, as shown in FIG. 4A, a top cover 1, a PUF (polyurethane foam) 2 and a nylonhalf 4 which is a knitwork of nylon. The multi-layered base member 20 has, as shown in FIG. 4B, a hot melt film 5, a PA (polyamide) film 6, a PP (polypropylene) film 7, a base material 8 and a non-woven fabric 9.

The multi-layered base member 20 is heated, thereby the hot melt film 5 on the front thereof is melted, so that the multi-layered base member 20 and the top cover member 30 are bonded together.

For improving the adhesive strength between the multi-layered base member 20 and the top cover member 30, the hot melt film 5 is required to have a film thickness of approximately from 75 to 100 $\mu$m, which normally has the thickness of approximately from 15 to 75 $\mu$m.

However, as in the earlier technology, when the film thickness of the hot melt film 5 is thickened, the production cost becomes higher. Further, when the top cover member 30 is bonded to the multi-layered base member 20 to be formed into a product shape of the formed lining for a vehicle, the stress applied to the hot melt film 5 increases. Thereby the adhesive strength becomes lower, so that a warp or deformation of the formed lining for a vehicle becomes large.

The nylonhalf 4 used on the back of the top cover member 30 has differences in expansion ratio between in a longitudinal direction and in a transverse direction, so that followability of the nylonhalf 4 for the product shape of the formed lining for a vehicle is low. Accordingly, portions not having the enough adhesive strength become raised portions.

When, for example, urethane foam having a thickness of approximately 1 to 3 mm as a cushion layer is used on the back of the top cover member 30, the adhesive strength between the top cover member 30 and the multi-layered base member 20 deteriorates.

That is, owing to the material used for the top cover member 30, the adhesive strength to the multi-layered base member 20 becomes lower.

For improving the adhesive strength, the hot melt film is disposed on the back of the top member cover 30. However, when the multi-layered base member 20 and the top member cover 30 are bonded, air is trapped between the base member 20 and the top cover member 30. Therefore, the bonded product is not useable as a formed lining for a vehicle.

SUMMARY OF THE INVENTION

The present invention was developed in view of the above-described problems. Therefore, an object of the present invention is to provide a formed lining for a vehicle, having high adhesive strength between a base member and a top cover member and no adhesion failure caused by trapped air between them. Another object of the invention is to provide a method for manufacturing the same.

In order to accomplish the above-described object, in one aspect of the present invention, a formed lining for a vehicle, comprises: a base member comprising a film-like hot melt adhesive on a front thereof; and a top cover member comprising a web-like hot melt adhesive on a back thereof, wherein the top cover member is bonded to the base member and the formed lining has a laminated structure.

In accordance with another aspect of the present invention, a method for manufacturing a formed lining for a vehicle, comprises the steps of: preparing a top cover member comprising a web-like hot melt adhesive laminated previously on a back thereof, and a plate-like base member comprising a thermoplastic resin and a film-like hot melt adhesive laminated previously on a front of the base member; heating the base member; setting the top cover member and the heated base member in a forming die; melting the web-like hot melt adhesive of the top cover member by heat of the base member; and forming the top cover member and the base member at the same time that the top cover member and the base member being bonded.

According to the formed lining for a vehicle, wherein the top cover member is bonded to the base member, the top cover member has the web-like hot melt adhesive on the back thereof, while the base member has the film-like hot melt adhesive on the front thereof, so that the adhesive strength between the top cover member and the base member is high. Accordingly, it is possible to apply various types of top cover member.

After the top cover member and the base member are bonded and formed, the residual stress in the adhesive layer is small, so that it is possible to prevent the deformation of the formed lining for a vehicle.

The top cover member has the web-like hot melt adhesive, thereby the air between the top cover member and the base member is easily discharged through the top cover member. Accordingly, it is possible to bond the top cover member and the base member so as to discharge the air between the top cover member and the base member and form a formed lining for a vehicle.

Further, because the web-like hot melt adhesive is disposed on the back of the top cover member, the top cover member is slid to a material placing table by the web-like hot melt adhesive layer in a pre-step prior being set to a forming machine, thereby the top cover member is easily set to the forming machine.

BRIEF DESCRIPTION OF THE DRAWINGS

The above and other objects, features and advantages of the invention will become more apparent from the following description taken in conjunction with the accompanying drawings wherein like references refer to like parts and wherein:

FIGS. 1A and 1B show members of a formed lining for a vehicle according to an embodiment of the invention: wherein FIG. 1A is a sectional view showing a top cover member; and FIG. 1B is a sectional view showing a multi-layered base member;

FIGS. 2A, 2B and 2C show a manufacturing process for the formed lining for a vehicle: wherein FIG. 2A is a schematically view showing a heating process for heating the multi-layered base member; FIG. 2B is a schematically view showing a transferring process for the multi-layered base member; and FIG. 2C is a schematically view showing a press forming process for the top cover member and the multi-layered base member;

FIGS. 4A and 4B show members of a formed lining for a vehicle in earlier technology: wherein FIG. 4A is a sectional view showing a top cover member; and FIG. 4B is a sectional view showing a multi-layered base member.

PREFERRED EMBODIMENT OF THE INVENTION

Hereinafter, a formed lining for a vehicle and a method for manufacturing the same according to an embodiment of the invention will be explained with reference to FIGS. 1A to 3.

Figure 1A:
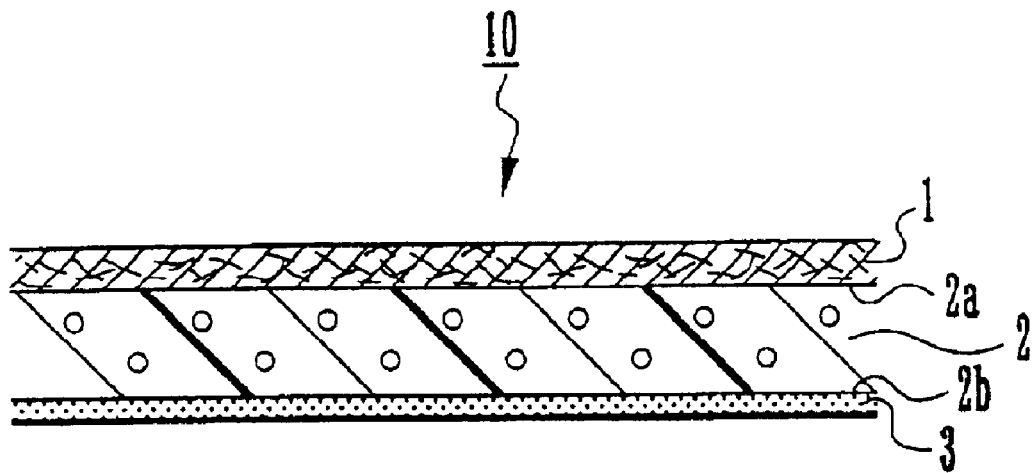
Figure 1B:
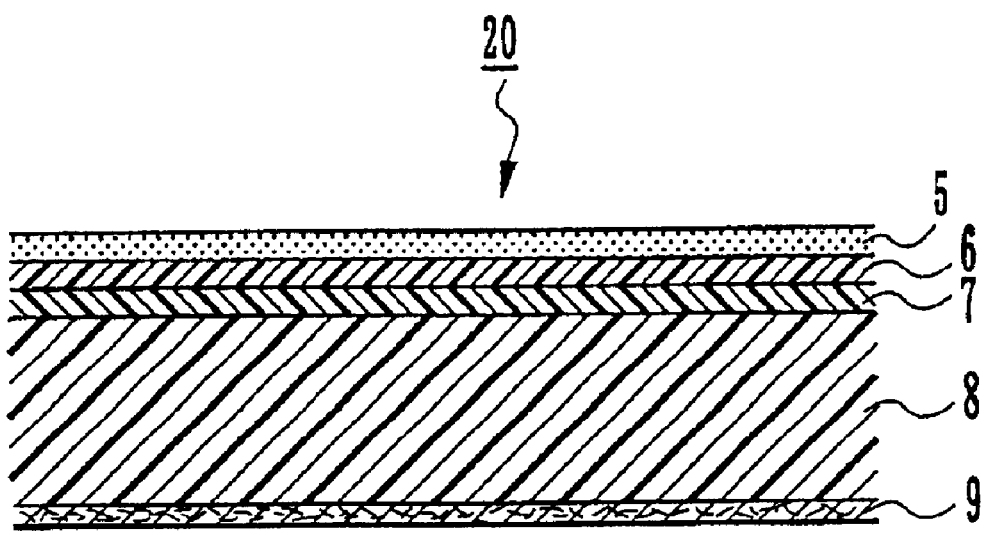

FIGS. 1A and 1B show members of a formed lining for a vehicle according to an embodiment of the invention, FIG. 1A is a sectional view showing a top cover member 10 and FIG. 1B is a sectional view showing a multi-layered base member 20.

The formed lining for a vehicle according to the embodiment of the invention is, for example, applied to a roof lining or a headliner for a vehicle, however, it can be applied to a side lining or the like. The formed lining for a vehicle according to the embodiment of the invention comprises the top cover member 10 and the multi-layered base member 20, which are shown in FIGS. 1A and 1B. With the formed lining, the top cover member 10 is bonded to the multi-layered base member 20.

The top cover member 10 comprises, as shown in FIG. 1A, a top cover 1, a PUF (polyurethane foam) 2, and a hot melt web 3.

The top cover 1 is made of tricot or other fabric material laminated on the front 2a of the PUF 2.

The PUF 2 is for a cushion layer for absorbing the external shock. On the front 2a thereof, the top cover 1 is laminated, while on the back 2b thereof, the hot melt web 3 is disposed.

The hot melt web 3 is an adhesive having, for example, a density of from 15 to 50 g/m$^2$ and a web-like structure, and including PA (polyamide), EVA (vinyl acetate), EEA (ethylene-ethyl acrylate copolymer), PO (polyolefin), PET (polyethylene terephthalate) or other components. The hot melt web 3 having the web-like structure has superior followability for the product shape of the formed lining for a vehicle, so that the adhesion between the top cover member 10 and the multi-layered base member 20 is improved. Accordingly, it is possible to obtain high adhesive strength.

The hot melt web 3 melts by the heat of the heated multi-layered base member 20 to bond the top cover member 10 and the multi-layered base member 20. At this time, because the hot melt web 3 has air permeability, the air between the top cover member 10 and the multi-layered base member 20 is discharged through the hot melt web 3 to prevent air from being trapped between the top cover member 10 and the multi-layered base member 20.

As shown in FIG. 1B, the multi-layered base member 20 comprises a hot melt film 5, a PA (polyamide) film 6, a PP (polypropylene) film 7, a base material 8 and a non-woven fabric 9.

The hot melt film 5 is a film-like adhesive, such as PA or EVA having, for example, a film thickness of approximately from 50 to 75 $\mu$m and disposed on the PA film 6. The hot melt film 5 melts uniformly by heating the multi-layered base member 20 by a heater, so that the hot melt film 5 bonds the top cover member 10 and the multi-layered base member 20.

The PA film 6 has superior heat resistance and, for example, a film thickness of from 15 to 60 $\mu$m and which is disposed above the base material 8. When the hot melt film 5 is heated by the heater to melt, the PA film 6 prevents infiltration of the adhesive into the base material 8. The PA film 6 also has efficiency of preventing ventilation.

The plate-like base material 8 includes thermoplastic resin which is made of glass fiber and PP (polypropylene), and which is, as a roof lining, formed into a desired three-dimensional product shape through a press forming process. On the front of the base material 8, the PP film 7 is disposed, while on the back thereof, the non-woven fabric 9 is disposed.

The non-woven fabric 9 is a backing cloth manufactured by a span bond method.

Next, the method for manufacturing the formed lining for a vehicle will be explained as follows with reference to FIGS. 2A to 2C.

As shown in FIG. 2A, the multi-layered base member 20 previously set to base member clamps 13 is heated in a heater 40, thereby the adhesive is melted uniformly. The heater 40 has an upper heater 11a and a lower heater 11b to uniformly melt the adhesive and to soften the multi-layered base member 20.

As shown in FIG. 2B, the heated and softened multi-layered base member 20 is transferred to a press forming machine 50 shown in FIG. 2C. The press forming machine 50 has a forming die comprising an upper die 12a and a lower die 12b.

The top cover member 10 is set to top cover member clamps 14. In a pre-step prior to being set to the top cover member clamps 14, the top cover member 10 is slid to a material placing table by the hot melt web 3, thereby the top cover member 10 is easily set to the clamps 14.

Then, the top cover member 10 having the hot melt web 3 and set to the top cover member clamps 14 is set between the upper and lower dies 12a and 12b, while the multi-layered base member 20 which is set to the base member clamps 13 and heated is set under the top cover member 10 set between the upper and lower dies 12a and 12b in the state that the base member 20 softens and the adhesive melts uniformly.

In this way, the clamps 14 to which the top cover member 10 is set and the clamps 13 to which the multi-layered base member 20 is set are set between the upper and lower dies 12a and 12b.

Then, the upper die 12a and the lower die 12b are put together, so that the cold press forming is performed for 20–30 seconds. At this time, the hot melt web 3 of the top cover member 10 melts by the heat of the heated multi-layered base member 20, so that the adhesive strength between the top cover member 10 and the multi-layered base member 20 is improved.

Figure 3:
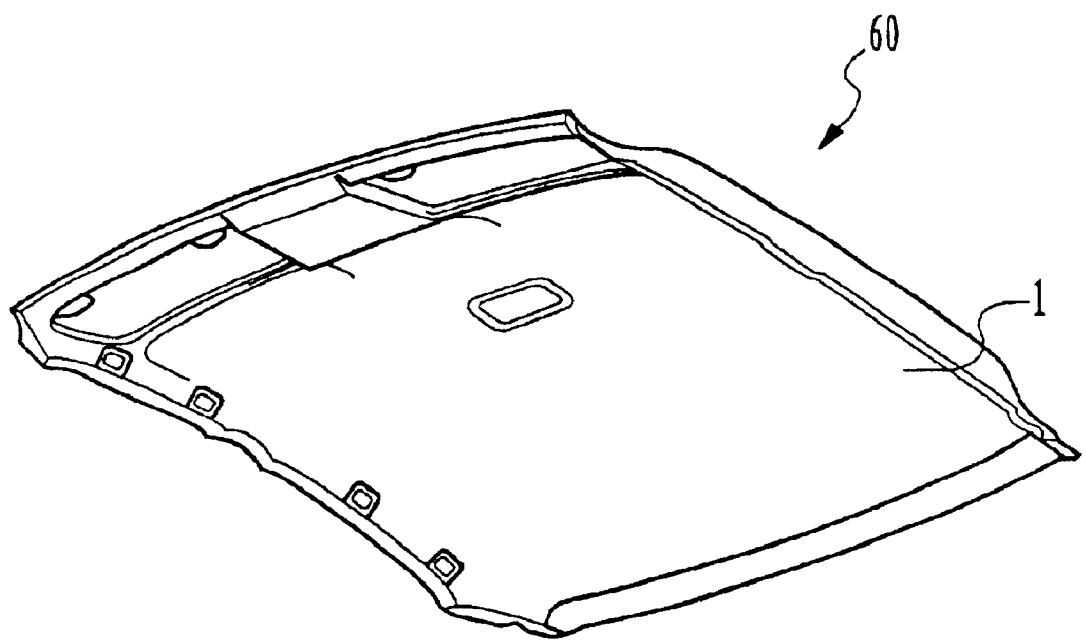
FIG. 3 is a perspective view showing a headliner assembly according to the embodiment of the present invention.
Figure 4A:
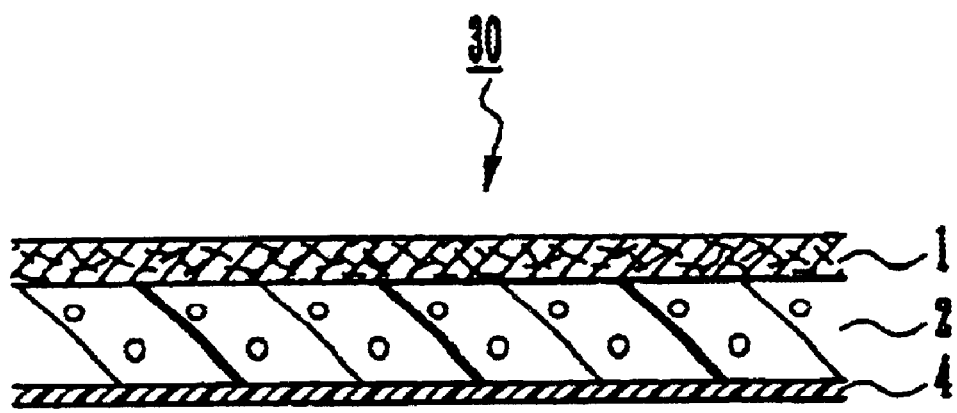
Figure 4B:
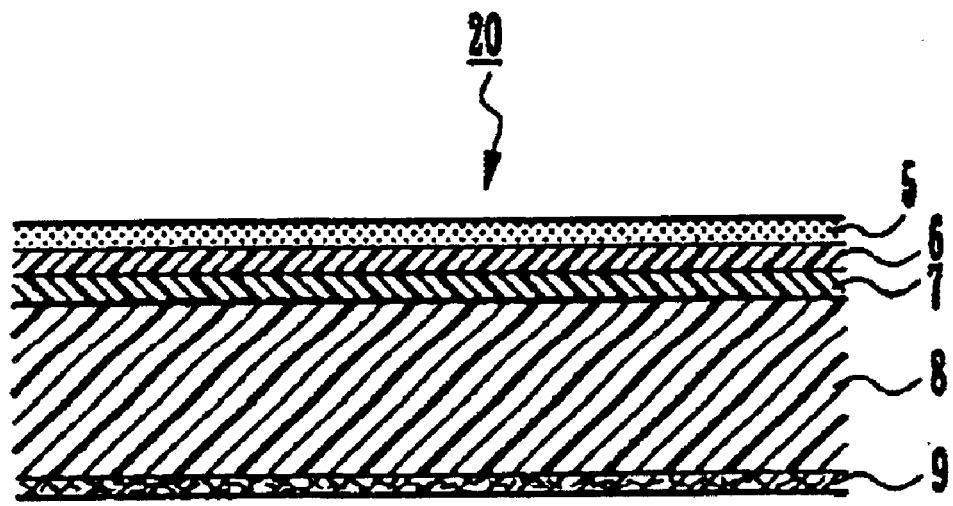

In this way, the top cover member 10 and the multi-layered base member 20 are bonded and at the same time formed into the product shape, so that the formed lining for a vehicle is manufactured. For example, a formed headliner assembly 60 as shown in FIG. 3 is manufactured. The headliner assembly or roof lining 60 as shown in FIG. 3 is shown from interior of the vehicle.

As described above, according to a formed lining for a vehicle, a multi-layered base member has a film-like hot melt adhesive on a front thereof, while a top cover member has a web-like hot melt adhesive on a back thereof, so that the adhesive strength between the top cover member and the base member is exceedingly improved. Accordingly, it is possible to apply various types of top cover member. For instance, it is possible to apply materials having inferior adhesion, such as the PUF (polyurethane foam) which is used as a cushion layer.

It is not required to thicken the film thickness of the film-like hot melt adhesive, so that the residual stress in the web-like hot melt adhesive and the film-like hot melt adhesive after bonding is small. Accordingly, it is possible to prevent deformation of the formed lining for a vehicle.

The web-like hot melt adhesive is disposed on the back of the top cover member, thereby the air between the top cover member and the base member is easily discharged through the top cover member. Accordingly, it is possible to bond the top cover member and the multi-layered base member so as to discharge the air between the top cover member and the multi-layered base member and form a formed lining for a vehicle. Therefore, it is possible to bond and form efficiently the top cover member and the multi-layered base member.

Further, because the web-like hot melt adhesive is disposed on the back of the top cover member, the top cover member is slid to a material placing table by the web-like hot melt adhesive in a pre-step prior being set to clamps for a top cover member, thereby the top cover member is easily set to the clamps.

From the foregoing description, one skilled in the art can easily ascertain the essential characteristics of this invention, and without departing from the spirit and scope thereof, can make various changes and modifications of the invention to adapt it to various usage and conditions.

The entire disclosure of Japanese Patent Application No. 11-152308 filed on May 31, 1999 including specification, claims, drawings and summary are incorporated herein by reference in its entirety.

What is claimed is:

1. A method for manufacturing a formed headliner for a vehicle, comprising:

laminating a hot melt adhesive in a pattern having a density from 15 to 50 g/m² on a back of a top cover member comprising a top cover and a polyurethane foam, the top cover being made of tricot and laminated on a front of the polyurethane foam, the hot melt adhesive in the pattern being disposed on a back of the polyurethane foam and being at least one selected from the group consisting of polyamide, vinyl acetate, ethylene-ethyl acrylate copolymer, polyolefin, and polyethylene terephthalate;

laminating a film of hot melt adhesive having a film thickness from 50 to 75 μm on a front of a base member comprising a polyamide film, a polypropylene film, a plate-like base material, and a non-woven fabric, the plate-like base material including thermoplastic resin being made of fiber and polypropylene and being formed into a three-dimensional product shape through a press forming process, the film of hot melt adhesive being at least one selected from the group consisting of polyamide and vinyl acetate and being disposed on the polyamide film, the polyamide film having heat resistance, efficiency of preventing ventilation and a film thickness from 15 to 60 μm and being disposed above the plate-like base material, the polypropylene film being disposed on a front of the plate-like base material, and the non-woven fabric being disposed on a back of the plate-like base material and being a backing cloth;

heating the base member having the laminated film of hot melt adhesive with a heater to melt the film of hot melt adhesive uniformly;

bonding the top cover member having the laminated hot melt adhesive in the pattern to the base member having the laminated film of hot melt adhesive by melting the hot melt adhesive in the pattern by heat from the heated base member, wherein the bonding is performed by bonding the surface of the hot melt adhesive in the pattern to the film of hot melt adhesive; and discharging air between the top cover member having the laminated hot melt adhesive in the pattern and the base member having the laminated film of hot melt adhesive through the hot melt adhesive in the pattern, the polyurethane foam, and the top cover member.

2. The method for manufacturing a formed headliner for a vehicle as claimed in claim 1, further comprising:

setting the base member to base member clamps;

heating the base member set to the base member clamps with the heater, wherein the heater has an upper heater and a lower heater, to uniformly melt the film of hot melt adhesive and to soften the base member;

transferring the heated and softened base member to a press forming machine having a forming die comprising an upper die and a lower die;

setting the top cover member to top cover member clamps by sliding the top cover member to a material placing table by the hot melt adhesive in the pattern;

setting the top cover member set to the top cover member clamps between the upper die and the lower die;

setting the heated base member set to the base member clamps under the top cover member set between the upper die and the lower die;

putting the upper die and the lower die together;

performing cold press forming for 20 to 30 seconds; and bonding the top cover member and the base member and at the same time forming the three-dimensional product shape.

* * * * *